United States Patent [19]

Kamata et al.

[11] Patent Number: 5,431,697
[45] Date of Patent: Jul. 11, 1995

[54] REVERSIBLY VARIABLE COLOR PATTERNING COMPOSITION FOR SYNTHETIC RESIN ARTICLES

[75] Inventors: Masayasu Kamata, Kusatsu; Hiromi Suno, Kyoto; Toshihisa Maeda, Uji; Ryuichi Hosikawa, Kyoto, all of Japan

[73] Assignee: Matsui Shikiso Chemical Co., Ltd., Kyoto, Japan

[21] Appl. No.: 255,999

[22] Filed: Jun. 8, 1994

[30] Foreign Application Priority Data

Jun. 14, 1993 [JP] Japan ................... 5-141615

[51] Int. Cl.⁶ ............................ D06P 3/79; D06P 5/20
[52] U.S. Cl. ................................ 8/483; 8/493; 8/497; 8/513
[58] Field of Search ............... 8/513, 497, 493, 483, 8/478, 527

[56] References Cited

U.S. PATENT DOCUMENTS 3,275,400 9/1966 Bonitz et al. .................. 8/513
5,151,324 9/1992 Hanatani ...................... 428/323
5,213,733 5/1993 Hwu et al. .................... 264/78
5,298,035 3/1994 Okamoto ...................... 8/555

FOREIGN PATENT DOCUMENTS 64-42214 2/1989 Japan .
3-200841 9/1991 Japan .

*Primary Examiner*—Linda Skaling
*Assistant Examiner*—Margaret Einsmann
*Attorney, Agent, or Firm*—Armstrong, Westerman, Hattori, McLeland & Naughton

[57] ABSTRACT

Disclosed are a reversibly variable color pattering composition for synthetic resin articles which includes a granulated material containing (i) an olefin polymer and (ii) at least one reversibly variable color material selected from the group consisting of thermochromic materials and photochromic materials, the granulated material having been subjected to crosslinking reaction following granulation; a method of producing the same; and a shaped article having a reversibly variable color pattern as molded from a molding composition including a synthetic resin and the color patterning composition.

8 Claims, No Drawings

REVERSIBLY VARIABLE COLOR PATTERNING COMPOSITION FOR SYNTHETIC RESIN ARTICLES

FIELD OF THE INVENTION

The present invention relates to a reversibly variable color patterning composition for use in the manufacture of patterned synthetic resin articles, a method for producing said reversibly variable color patterning composition, and a shaped article having a reversibly variable color pattern.

BACKGROUND ART

The known technology for manufacturing a colored synthetic resin article having a pattern consisting of a plurality of different colors includes a process comprising blending two kinds of dye- or pigment-containing resins varying in melt viscosity and molding the blend and a process comprising incorporating a dye or pigment in an olefinic resin and another dye or pigment in a resin incompatible with the olefinic resin, such as a polyester, MMA, polysulfone or other resin, and molding these resins together. However, since the patterns of the molded articles obtained by these processes are comprised of the conventional dyes or pigments, they are invariably prosaic and deficient in fashionableness and functionality, thus being of no satisfactory market value. Furthermore, when such a blend of olefinic resin and incompatible resin is used, the resultant article consisting of different types of resins has the disadvantage of inadequate elongation, impact strength and/or other physical properties.

Recently, attempts have been made to manufacture a shaped article the overall color of which may change reversibly according to change in ambient temperature or available light quantity from a synthetic resin containing a thermo- or photochromic substance. However, there is not known a method for manufacturing a shaped article which changes in color reversibly and selectively in the areas forming the pattern. Thus, synthetic resin articles with greater aesthetic values and improved marketability have been demanded.

The object of the present invention is to provide a reversibly variable color patterning composition which can be used with advantage for forming figurative or other patterns which change in color reversibly on shaped synthetic resin articles.

SUMMARY OF THE INVENTION

The inventors of the present invention have done much research for overcoming the above-mentioned disadvantages of the prior art. As a consequence, the inventors discovered that a color patterning composition prepared by blending an olefin polymer with a thermo- or photochromic material, granulating the resultant blend and causing the olefin polymer to crosslink can be blended with an olefinic or other synthetic resin and molded to easily produce a shaped resin article which has a colored pattern containing said thermo- or photochromic material. The resultant article has a pattern which changes in color reversibly in response to change in ambient temperature or available light. The inventors further found that particularly when a microencapsulated thermo- or photochromic material is employed, there are obtained articles responding to change in ambient temperature or available light with particularly high sensitivity to undergo reversible changes in color. The inventors further discovered that when the same olefin polymer as used for said color patterning composition is used for the background molding resin, the resultant article has excellent physical properties. The present invention has been developed on the basis of the above findings.

Thus, the present invention provides a reversibly variable color patterning composition for use in the manufacture of synthetic resin articles, a method of producing said reversibly variable color patterning composition and a shaped article having a reversely variable color pattern, viz.

1. A reversibly variable color patterning composition for synthetic resin articles which comprises a granulated material containing (i) an olefin polymer and (ii) at least one reversibly variable color material selected from the group consisting of thermochromic materials and photochromic materials, said granulated material having been subjected to crosslinking reaction following granulation.

2. A method of producing a reversibly variable color patterning composition characterised by blending at least one reversibly variable color material selected from the group consisting of thermochromic materials and photochromic materials with an olefin polymer, granulating the resultant blend and subjecting the granulated material to crosslinking reaction.

3. A shaped article having a reversibly variable color pattern as molded from a composition comprising a synthetic resin and the color patterning composition mentioned under 1.

The color patterning composition of the invention can be produced by blending a thermo- and/or photochromic material with an olefin polymer, granulating the resulting blend and crosslinking the olefin polymer in the granulated material. In the granulation stage, the low viscosity of the non-crosslinked olefin polymer does not call for intense agitation so that even when a microencapsulated thermo- or photochromic material is employed, there occurs no destruction of the microcapsules in the granulation stage. Furthermore, the color patterning composition of the invention contains no polar material that might interfere with the color changing function of the thermo- or photochromic material. Then, as the granulated material is subjected to crosslinking reaction, a high melt viscosity is developed. Therefore, blending this material with various synthetic resins and molding the resulting compositions easily yield synthetic resin articles having figurative or other patterns, such as speckled pattern, marble-like pattern, flow pattern, etc., which change in color reversibly responding with high sensitivity to changes in ambient temperature or available light.

In the case of the prior art patterning method employing two different resins having dissimilar melt viscosity values, it is necessary to use a resin having a fairly high melt viscosity as the pattern-forming resin and when such resin is blended with a microencapsulated thermo- or photochromic material prior to granulation, it is necessary to agitate the blend at a high temperature with an intense mixing force but such rugged granulating conditions would destroy the microcapsules to prevent the designed reversible color change function to be sufficiently developed. Referring to the color patterning method employing a resin incompatible with olefinic resin, said incompatible resin usually contains polar groups which interfere with the color changing function of the thermo- or photochromic material so that no satisfactory reversible color pattern can be obtained.

DETAILED DESCRIPTION OF THE INVENTION

The present invention is now described in detail.
Color Patterning Composition
The ingredients of the color patterning composition of the invention are now described.
1. Olefin Polymer The olefin polymer which can be used in the invention includes olefin homopolymers such as polypropylene, polyethylene, etc. and copolymers of olefinic monomers, such as ethylene, propylene, etc., with a minor proportion (generally 0.1 to 25 weight %, preferably 0.5 to 6 weight %) of other vinyl monomers. The density and viscosity of the olefin polymer are not critical. However, it is preferable that the olefin polymer have a density in the range of about 0.85 to 0.97 g/cm$^3$ and a melt index in the range of about 0.1 to 70 g/10 min. and, for still better results, about 0.2 to 50 g/10 min. Such olefin polymer include, among others, a variety of polyethylene resins such as ultra-low density polyethylene, low density polyethylene, linear polyethylene, medium density polyethylene, high density polyethylene, etc., ethylene copolymers such as ethylene-vinyl acetate copolymer with a vinyl acetate content of 0.1 to 25 weight %, ethylene-acrylic acid copolymer with an acrylic acid content of 0.1 to 25 weight %, propylene resins such as polypropylene, propylene-ethylene (0.5 to 10 wt. %) copolymer, propylene-hexene-1 copolymer, etc., polybutene, ethylene-propylene rubber, ethylene-propylene-diene rubber and so on.

The olefin polymers particularly suited for the purposes of the invention contain alkoxysilane groups. Such alkoxysilane-containing olefin polymers are advantageous in that in the crosslinking stage following granulation together with a thermo- or photochromic material, they can be crosslinked using a silanol condensation catalyst such as dibutyltin dilaurate in the presence of water at a comparatively low temperature so that they do not exert adverse effects on the thermo- or photochromic material, nor do they require any specialized expensive reaction hardware. Although the proportion of alkoxysilane groups in the polymer is not particularly limited, it can be generally selected from the range of about 0.1 to 50 weight %, preferably about 0.5 to 10 weight %, based on the weight of the olefin polymer, according to the designed degree of crosslinking. The preferred examples of the alkoxy-silane-containing olefin polymer are polyolefins modified with a vinylsilane compound, namely polyolefins graft-copolymerized with various vinylsilane compounds such as vinyltrimethoxysilane, γ-methacryloyloxy-propyltrimethoxysilane, etc. and random copolymers of ethylene with vinylsilane compounds. Such vinylsilane-containing olefin polymers are described in Japanese Examined Patent Publication No. 1711/1973, Japanese Unexamined Patent Publications No. 36115/1984 and No. 9611/1980 and other literature and can be obtained from commercial sources.

2. Thermochromic Material

The thermochromic material which can be used in the present invention includes, among others, a variety of known thermochromic materials each containing an acid-responsive chromogenic substance and an acidic substance.

The acid-responsive chromogenic substance in said thermochromic material includes triphenylmethanephthalide compounds, phthalide compounds, phthalan compounds, acyl-leucomethylene blue compounds, fluoran compounds, triphenylmethane compounds, diphenylmethane compounds, spiropyran compounds and so on. Among species of such compounds are 3,6-dimethoxyfluoran, 3,6-dibutoxyfluoran, 3-diethylamino-6,8-dimethylfluoran, 3-chloro-6-phenylaminofluoran, 3-diethylamino-6-methyl-7-chlorofluoran, 3-diethylamino-7,8-benzofluoran, 2-anilino-3-methyl-6-diethylaminofluoran, 3,3′,3″-tris(p-dimethylaminophenyl)phthalide, 3,3′-bis(p-dimethylaminophenyl)phthalide, 3-diethylamino-7-phenylaminofluoran, 3,3-bis(p-diethylaminophenyl)-6-dimethylaminophthalide, 3-(4-diethylaminophenyl)-3-(1-ethyl-2-methylindol-3-yl)phthalide, 3-(4-diethylamino-2-methyl)phenyl-3-(1,2-dimethylindol-3-yl)phthalide, 2′-(2-chloroanilino)-6′-dibutylaminospiro-[phthalido-3,9′-xanthene] and so on.

The acidic substance mentioned above includes 1,2,3-benzotriazole compounds, phenol compounds, thiourea compounds, oxo-aromatic carboxylic acids and so on. Among specific examples of such compounds are 5-butylbenzotriazole, bisbenzotriazole-5-methane, phenol, nonylphenol, bisphenol A, bisphenol F, 2,2′-biphenol, β-naphthol, 1,5-dihydroxynaphthalene, alkyl p-hydroxybenzoates, phenol resin oligomer and so on.

The amount of the acidic substance may be in the range of about 0.1 to 50 parts by weight per part by weight of the acid-responsive chromogenic substance.

Any of the thermochromic materials each containing an acid-responsive chromogenic substance and an acidic substance is preferably used as diluted with a solvent beforehand. The use of a solvent renders the material responsive to change in temperature with greater sensitivity and definition. The solvent which can be used for the thermochromic material includes, among others, alcohols, alcohol-acrylonitrile adducts, azomethine compounds, esters and so on. Among specific examples of the solvent are decyl alcohol, lauryl alcohol, myristyl alcohol, cetyl alcohol, stearyl alcohol, behenyl alcohol, lauryl alcohol-acrylonitrile adduct, myristyl alcohol-acrylonitrile adduct, stearyl alcohol-acrylonitrile adduct, benzylidene-p-toluidine, benzylidene-butylamine, octyl caprate, decyl caprate, myristyl caprylate, decyl laurate, lauryl laurate, myristyl laurate, decyl myristate, lauryl myristate, cetyl myristate, lauryl palmitate, cetyl palmitate, stearyl palmitate, cetyl p-t-butylbenzoate, stearyl 4-methoxybenzoate, dilauryl thiodipropionate, dimyristyl thiodipropionate, stearyl benzoate, benzyl stearate, dibenzyl thiodipropionate, distearyl thiodipropionate, benzyl benzoate, glycerol trilaurate and so on.

The amount of the solvent may be in the range of 0 to 800 parts by weight, preferably 0.1 to 100 parts by weight, per part by weight of the acid-responsive chromogenic substance.

It should be understood that the term 'thermochromic material' is used herein to mean any and all thermochromic materials inclusive of pseudo-thermochromic materials which show a hysteresis of thermochromism.

3. Photochromic Material

The photochromic material which can be used in the present invention includes organic photochromic substances such as azobenzene compounds, thioindigo compounds, dithizone metal complex compounds, spiropyran compounds, spirooxazine compounds, fulgide compounds, dihydropyrene compounds, spirothiopyran compounds, 1,4-2H-oxazine, triphenylmethane compounds, viologen compounds, naphthopyran compounds, benzopyran compounds and so on. Particularly preferred for purposes of the invention are spiropyran compounds, spirooxazine compounds, fulgide compounds, naphthopyran compounds and benzopyran compounds.

Among specific examples of said photochromic substance are 1,3,3-trimethylspiro[indoline-2,3'-(3H)naphtho(2,1-b)(1, 4)-oxazine], 6'-indolino-1,3,3-trimethylspiro[indoline-2,3'-(3H)naphtho(2,1-b)(1,4)-oxazine], 5-chloro-1,3,3-trimethylspiro[indoline-2,3'-(3H)naphtho(2,1-b)(1,4)-oxazine], 6'-piperidino-1,3,3-trimethylspiro[indoline-2,3'-(3H)naphtho(2,1-b)(1,4)-oxazine], 1-benzyl-3,3-dimethylspiro[indoline-2,3'-(3H)naphtho(2,1-b)(1,4)-oxazine], 1,3,5,6-tetramethyl-3-ethylspiro[indoline-2,3'-(3H)naphtho(2,1-b)(1,4)-oxazine], 1,3,3,5,6-pentamethylspiro[indoline-2,3'-(3H)naphtho(2,1-b)(1,4)-oxazine], 1,3,5,6-tetramethyl-3-ethylspiro[indoline-2,3'-(3H)pyrido(3,2-f)(1,4)-benzoxazine], 1,3',3'-trimethylspiro(2H-2-benzopyran-2,2'-indoline), 1,3,3-triphenylspiro[indoline-2,3'-(3H)naphtho(2,1-b)pyran], 1-(2,3,4,5,6-pentamethylbenzyl)-3,3-dimethylspiro[indoline-2,3'-(3H)naphtho(2,1-b)pyran], 1-(2-nitrobenzyl)-3,3-dimethylspiro[indoline-2,3'-(3H)naphtho(2,1-b)pyran], 2,2-diphenylnaphtho(2,1-b)pyran, 2,2-di(p-methoxyphenyl)naphtho(2,1-b)pyran, 2,5-dimethylfuryltrimethylfulgide, 2-methyl-5-chlorotrimethylfulgide, spiro[2H-chromen-2,2'-tricyclo[3.3.1.1$^{3.7}$]decane, spiro[2H-naphtho[1,2-b]pyran-2,2'-tricyclo[3.3.1.1$^{3.7}$]decane], 5,7-dimethylspiro[2H-chromene-2,2'-tricyclo[3.3.1.1$^{3.7}$]decane], 6-(4-methoxyphenyl)-9-methoxyspiro[2H-naphtho[1,2-b]pyran-2,2'-tricyclo][3.3.1.1$^{3.7}$]decane], 6-chlorospiro[2H-naptho[1,2-b]pyran-2,2'-tricyclo[3.3.1.1$^{3.7}$] decane and so on.

The photochromic substance can be used independently but for the=purpose of improving the color changing function or the fastness to light, it is preferable to concomitantly use auxiliary agents such as high-boiling solvents, plasticizers, synthetic resins, hindered amines, hindered phenols and so on. These compounds are well known additives for use in combination with photochromic substances and their proportions can be selected from the known ranges. In the present invention, for the purpose of improving the light fastness of said organic photochromic substances, the use of a hindered amine compound or a combination of a hindered amine and other auxiliary agents is recommended.

The hindered phenol compound includes, among others, 2,6-di-t-butylphenol, 2,4,6-tri-t-butylphenol, 2,6-di-butyl-p-cresol, 4-hydroxymethyl-2,6-di-t-butylphenol, 2,5-di-t-butylhydroquinone, 2,2'-methylene-(4-ethyl-6-t-butylphenol), 4,4'-butylidene-bis(3-methyl-6-t-butylphenol) and so on. The hindered amine compound includes, among others, bis(2,2,6,6-tetramethyl-4-piperidinyl)sebacate, bis(1,2,2,6,6-pentamethyl-4-piperidinyl)sebacate, polycondensate of dimethyl succinate and 1-(2-hydroxyethyl)-4-hydroxy-2,2,6,6-tetramethylpiperidine, bis(1,2,2,6,6-pentamethyl-4-piperidinyl) 2-(3,5-di-t-butyl-4-hydroxybenzyl)-2-n-butylmalonate, 1-[2-{3-(3,5-di-t-butyl-4-hydroxyphenyl)propionyloxy} ethyl]-4-{3-(3,5-di-t-butyl-4-hydroxyphenyl)propionyloxy}-2,2,6,6-tetramethylpiperidine, 8-benzyl-7,7,9,9-tetramethyl-3-octyl-1,3,8-triazaspiro[4.5]undecane-2,4-dione, tetrakis(2,2,6,6-tetramethyl-4-piperidine)butane carbonate, and Mark LA57, Mark LA62 and Mark LA67 (all the trademarks of Adeka-Argus Chemical Co., Ltd.) which are disclosed in Japanese Unexamined Patent Publication No. 252496/1987.

4. Microencapsulation of Thermo- and/or Photochromic Materials

In the present invention, the reversibly variable color material comprising at least one species of the above-described thermochromic materials and photochromic materials can be directly blended with an olefin polymer. Preferably, however, such reversibly variable color material is microencapsulated beforehand. By such microencapsulation of a thermochromic material, the proportions of the acid-responsive chromogenic substance, acidic substance and solvent can be maintained in the pattern of a shaped article. In the case of a photochromic material, too, the proportions of the photochromic substance and auxiliary agents can be maintained in the pattern. In both cases, a satisfactory color change function can thereby be insured.

The microencapsulation can be carried out in the conventional manner. For example, using the reversibly variable color material, a shell-forming polymer and, where necessary, a surfactant, protective colloid, pH control agent, electrolyte, etc., the desired microcapsules can be prepared in water by any of interfacial polymerization, in situ polymerization, coacervation, air suspension, interfacial precipitation and other techniques. By such processes, microcapsules including the reversibly variable color material and measuring about 1 to 50 μm in diameter can be obtained. It is also possible to provide double- or multiple-walled microcapsules by using one, two or more of the microencapsulation techniques mentioned above. The preferred shell-forming material includes a polyamine and a carbonyl compound for forming a polyurea shell, a polybasic acid chloride and a polyamine for forming a polyamide shell, a polyisocyanate and a polyhydroxy compound for forming a polyurethane shell, a polybasic acid chloride and a polyhydroxy compound for forming a polyester shell, an epoxy compound and a polyamine for forming an epoxy resin shell, a melamine-formaldehyde prepolymer for forming a melamine resin shell and a urea-formaldehyde prepolymer for forming a urea resin shell, as well as ethylcellulose, polystyrene, polyvinyl acetate and so on. The shell of said microcapsules is preferably made of a thermosetting material which is superior in heat resistance.

Preparation of a Color Patterning Composition

First, a granulated material is prepared using an olefin polymer and a reversibly variable color material comprising at least one member of thermochromic materials and photochromic materials.

The thermo- or-photochromic material can-be used either as it is or as microencapsulated. The thermochromic and photochromic materials can be used independently or as a mixture of different species and, if desired, both the thermochromic and photochromic materials can be incorporated in the same microcapsule.

The amount of the reversibly variable color material comprising at least one member of said thermochromic materials and photochromic materials is preferably about 0.1 to 60 parts by weight and, for still better results, about 0.1 to 40 parts by weight per 100 parts by weight of the olefin polymer. The microencapsulated material can also be used in the same proportion as above.

The granulated material can be prepared in the conventional manner. An exemplary procedure comprises blending the olefin polymer and reversibly variable color material in a Henschel mixer, V-blender, tumbler or the like and, then, granulating the blend in a granulator at a temperature of about 160°–240° C. In order to obtain a homogeneous blend of the reversibly variable color material and olefin polymer, a dispersant such as a metal salt of stearic acid or of oleic acid and a compatibilizer such as a low-molecular polyethylene wax can be incorporated.

Where an olefin polymer having crosslinking radicals, such as a vinylsilane-modified polyolefin, is employed, a catalyst necessary for subsequent crosslinking reaction, such as dibutyltin dilaurate, is added.

The term 'granulated material' as used in this specification, where applicable, means granules such as pellets, beads and the like. The mean diameter of the granulated material is preferably about 0.01 to 10 mm and, for still better results, about 0.1 to 7 mm. The ratio of L/D (length/diameter) of pellets or beads may range from about 0.5 to about 3. The mean particle size is used as the value of D (diameter).

Granules in the pellet or bead form can be prepared by the conventional methods such as the strand cutting method, hot cutting method, underwater cutting method and so forth.

The resultant granulated material is then subjected to crosslinking reaction to provide a reversibly variable color patterning composition. The crosslinking reaction can be carried out by the known methods, for example the chemical crosslinking method using a peroxide, the radiation crosslinking method using, for instance, an electron beam, the ultra-high pressure crosslinking method, etc., all under the usual conditions. When an alkoxysilane-containing olefin polymer is employed, the crosslinking reaction can be easily carried out in the presence of water by the so-called warm-water crosslinking method in a broad temperature range from atmospheric temperature to heating without resort to any specialized, expensive curing equipment. This process is further advantageous in that the reversibly variable color material is not adversely affected.

The degree of crosslinking of the olefin polymer is preferably not less than 2 weight % according to JISC3005. It is preferably not less than 4 weight % and, for still more results, 4 to 90 weight %.

Where the olefin polymer has crosslinking radicals, the degree of crosslinking can be easily controlled by blending it with a different olefin polymer.

When an olefin polymer having crosslinking radicals is so blended with another olefin polymer, it is recommendable to select polymers in the same category from the standpoint of compatibility and physical properties. The advantage of using an olefin polymer having crosslinking radicals in combination with a different olefin polymer is that a composition insuring the desired degree of crosslinking can be quite easily prepared by adjusting their proportions.

Since, in the present invention, an uncured olefin polymer is blended with a reversibly variable color material and a granulated material is prepared using the resultant blend, the blending operation causes no remarkable increase in viscosity so that even the microencapsulated reversibly variable color material is employed, the microcapsules are not destroyed. After granulation, the olefin polymer is crosslinked to increase its melt viscosity. These crosslinked granules can be blended with a synthetic resin and the resultant blend be molded to provide a patterned resin article with ease.

Shaped Article of Synthetic Resin

In accordance with the present invention, the above reversibly variable color patterning composition is blended with a synthetic resin and the resultant blend is molded to provide a shaped resin article having a pattern which changes in color reversibly in response to changes in ambient temperature or available light.

The synthetic resin mentioned above can be any of various thermoplastic synthetic resins such as polyolefin resin, polystyrene resin, polyamide resin, ABS resin, AS resin, polyester resin, polyphenylene ether resin, polyvinyl chloride resin and so on. Particularly preferred is a polyolefin resin.

As specific examples of the polyolefin resin, the same olefin polymers as those mentioned hereinbefore can be employed. Particularly in consideration of the ease of molding, prominence of the color pattern and physical properties of the article, it is recommendable to select a polyolefin in the same category as the olefin polymer used in the preparation of the color patterning composition.

The relative amount of said reversibly variable color patterning composition to said synthetic resin is about 0.1 to 50 parts by weight and preferably about 0.5 to 30 parts by weight of the former per 100 parts by weight of the latter. If the proportion of the color patterning composition is less than 0.1 part by weight, the color of the patterning composition is overshadowed by the ground color of the synthetic resin so that no distinct pattern can be obtained. If the proportion exceeds 50 parts by weight, the color of the patterning composition becomes too dominating, so that the pattern becomes rather unattractive. More than one kind of color patterning compositions can be employed in combination. If required, various coloring matters such as dyes, ordinary organic or inorganic pigments, fluorescent pigments, light storage pigments, metallic luster pigments, etc., dispersants such as zinc stearate etc., lubricants, UV absorbers, antistatic agents, copper antipollutants and other stabilizers, flame retardants, fillers, blowing agents, etc. can also be added.

Blending of the color patterning composition with the synthetic resin can be carried out by the known blending techniques such as the blending method using a V-blender, tumbler, Henschel mixer or the like and the hand blending method.

The method of molding for the manufacture of synthetic resin articles is not particularly limited. Thus, injection molding, extrusion molding, blow molding and other usual molding processes can be employed.

When the color patterning composition of the invention is employed, a shaped article having a complicated pattern which changes in color reversibly according to ambient temperature or available light can be manufactured by the very simple procedure of blending it with a synthetic resin and molding the blend. The resultant article can have a sophisticated, highly fashionable appearance.

The color patterning composition of the invention is characterized in that because of the low viscosity of the uncured olefin polymer, the granulation procedure does not require an intense mixing force so that even when the reversibly variable color material has been microencapsulated, the microcapsules are not destroyed in the course of granulation. In addition, since the olefin polymer used has no polar radicals, the color changing function of the thermo- or photochromic material is not adversely affected. Therefore, the color pattern obtainable by using this color patterning composition shows an excellent thermo- and/or photochromic color effect. Moreover, when an alkoxysilane-containing polymer is used as the olefin polymer, it can be conveniently cured in the presence of water at a comparatively low temperature to thereby avoid an adverse effect on the thermo- or photochromic material and, moreover, no specialized, expensive curing equipment is required.

EXAMPLES

The following examples are intended to describe the invention in further detail.

EXAMPLE 1

To 100 parts by weight of a silane-crosslinkable polypropylene resin (trademark: Linklon XPM700B, Mitsubishi Petrochemical Co., Ltd.) were added 0.05 parts by weight of dibutyltin dilaurate, 3 parts by weight of a microencapsulated thermochromic material [1 part by weight of 2-anilino-3-methyl-6-diethylaminofluoran (acid-responsive chromogenic substance), 3 parts by weight of bisphenol A (acidic substance) and 25 parts by weight of cetyl alcohol (solvent) as microencapsulated in 6 parts by weight of epoxy resin], 0.5 part by weight of titanium dioxide and 0.1 part by weight of magnesium stearate and the mixture was blended in a tumbler for 15 minutes. Using an extruder (bore diameter 40mm, L/D 32), the blend was melt-extruded at a temperature of 210° C. to provide pellets having a diameter of 2 mm. These pellets were immersed in hot water at 90° C. for 5 hours for crosslinking, dehydrated and dried to provide about 100 parts by weight of a color patterning composition. The pellets had a degree of crosslinking equal to 78 weight % and while the pellets were black at 25° C., they turned white at 40° C.

Then, 100 parts by weight of polypropylene (trademark: Noblen AX961, Sumitomo Chemical Co., Ltd.), 0.5 part by weight of titanium dioxide, 0.2 part by weight of magnesium stearate, 0.2 part by weight of zinc stearate and 10 parts by weight of the above color patterning composition were blended-in a tumbler for 15 minutes and using an injection molding machine, the blend was melt-molded into a bath pail. This bath pail looked like a marble pail having a black-on-white pattern at room temperature. However, when this pail was dipped into the bath water, it instantly became a white solid-color pail. This change of color could recur a number of times. The physical properties of the product were also comparable to those of the product made of polypropylene alone.

EXAMPLE 2

Seventy (70) parts by weight of the same silane-crosslinkable polypropylene (trademark: Linklon XPM700B) as used in Example 1, 30 parts by weight of polypropylene resin (trademark: Noblen AX961), 0.04 part by weight of dibutyltin dilaurate, 2 parts by weight of a microencapsulated thermochromic material (trademark: Chromicolor Fast Blue S-17, Matsui Shikiso Chemical Co., Ltd.; a blue acid-responsive chromogenic substance, a phenolic acidic substance and an alcoholic solvent as microencapsulated in thermosetting resin), 1 part by weight of magnesium stearate and 1 part by weight of zinc stearate were blended in a tumbler for 15 minutes. Then, in the same manner as in Example 1, pellets measuring 3 mm in diameter were prepared and, then, crosslinked to provide about 100 parts by weight of a color patterning composition in the crosslinked pellet form. This color patterning composition had a degree of crosslinking equal to 55 weight % and while it was colorless at 25° C., it turned blue when cooled to 10° C.

Following the same procedure as above except that Chromicolor Fast Blue S-17 was replaced with Chromicolor Yellow S-17 (a microencapsulated thermochromic material manufactured by Matsui Shikiso Chemical Co., Ltd.; a yellow acid-responsive chromogenic substance, a phenolic acidic substance and an alcoholic solvent as microencapsulated in a thermosetting resin), about 100 parts by weight of a color patterning composition was prepared in the crosslinked pellet form. This color patterning composition had a degree of crosslinking equal to 55 weight % and while it was colorless at 25° C., it turned yellow when cooled to 10° C.

Then, 10 parts by weight each of the above color patterning compositions were respectively added to 100 parts by weight of polypropylene resin (trademark: Hipol J850Y, Mitsui Petrochemical Industries Ltd.) and the mixture was blended in a tumbler for 15 minutes and molded into a cup by means of an injection molding machine. This cup was colorless at 25° C. but when filled with cold water at 10° C., it presented a ink-blow pattern (marble-like pattern) of contrasting blue and yellow colors. This change in color could recur a number of times. Moreover, the physical properties of this product were comparable to those of the product made of polypropylene alone.

EXAMPLE 3

One hundred (100) parts by weight of a silane-crosslinkable polyethylene (trademark: Moldex S161, Sumitomo Bakelite Co., Ltd.), 100 parts by weight of polyethylene resin (trademark: Sumikathene F101-3, Sumitomo Chemical Co., Ltd.), 0.05 part by weight of dioctyltin dilaurate, 5 parts by weight of a microencapsulated photochromic material [1 part by weight of 1,3,3-trimethylspiro[indoline-2,3'-(3H)naphtho(2,1-b)(1,4)-oxazine] (an organic photochromic compound) and 24 parts by weight of bis(1,2,2,6,6-pentamethyl-4-piperidinyl)sebacate (a hindered amine compound) as microencapsulated in 5 parts by weight of epoxy resin], 1 part by weight of titanium dioxide and 1 part by weight of magnesium stearate were stirred and blended in a Henschel mixer for 3 minutes. The resultant blend was melt-extruded using an extrusion granulator (bore diameter 40 mm, L/D32) at 185° C. to provide pellets measuring 2 mm in diameter.

The pellets were crosslinked in hot water at 90° C. for 3 hours, dehydrated and dried to provide about 205 parts by weight of a color patterning composition in the crosslinked pellet form. This color patterning composition had a degree of crosslinking equal to 35 weight %. While this composition was white in a room not exposed to direct sunlight, it turned deep blue when it was brought out in the sun.

Then, 8 parts by weight of the above color patterning composition was added to 100 parts by weight of polyethylene resin (trademark: Sumikathene F101-3) supplemented with 0.4 part by weight of a dry color (a color for plastics coloring) (trademark: Yellow PP-020, Dainichi Seika Color & Chemicals Mfg. Co., Ltd.) and the mixture was blended in a tumbler for 15 minutes. Using a blow molding machine, the blend was molded into a water bottle. This water bottle presented a white-on-yellow pattern in a room not exposed to direct sunlight but the white pattern area turned brilliant blue when the bottle was brought out in the sun. This color change could recur a number of times. Moreover, the physical properties of this product were comparable to those of the product made of polyethylene alone.

EXAMPLE 4

Five (5) parts by weight of a catalyst master batch comprising 100 parts by weight of polyethylene resin (trademark: Sholex M221, Showa Yuka K.K.) and 1 part by weight of dibutyltin dilaurate was blended with 100 parts by weight of a silane-crosslinkable polyethylene (trademark: Moldex S672, Sumitomo Bakelite Co., Ltd.). To this composition were added 2 parts by weight of a microencapsulated photochromic material (trademark: Photopia Yellow, Matsui Shikiso Chemical Co., Ltd.; a naphthopyran photochromic compound, a synthetic resin and a plasticizer as microencapsulated in a thermosetting resin) and 0.1 part by weight of magnesium stearate and the mixture was stirred in a Henschel mixer for 3 minutes. Then, in the same manner as in Example 3, about 105 parts by weight of a color patterning composition in the crosslinked pellet (diameter 1.5 mm) form was prepared. This color patterning composition had a degree of crosslinking equal to 75 weight %. This composition was colorless in a room not exposed to direct sunlight but turned deep yellow when brought out in the sun.

On the other hand, the above procedure was repeated except that the miroencapsulated photochromic material (Photopia Yellow) was replaced with a microencapsulated thermochromic material (trademark: Chromi color Fast Blue S-27, Matsui Sikiso Chemical Co. Ltd.; a blue acid-responsive chromogenic substance, a phenolic acidic substance and an alcoholic solvent as microencapsulated in thermosetting resin) to provide about 105 parts by weight of a color patterning composition in the crosslinked pellet form. This color patterning composition had a degree of crosslinking equal to 75 weight %. While this composition was blue at 25° C., it became colorless at 35° C.

Then, 3 parts by weight each of the above two color patterning compositions were respectively added to 100 parts by weight of polyethylene resin (trademark: Staflene E792, Nippon Petrochemicals Co., Ltd.) and the mixture was blended in a tumbler for 15 minutes. Using an injection molding machine, the above blend was molded into the handle of a tooth brush. This brush handle changed its pattern color in several ways according to changes in temperature and available light, thus being of great fashionableness. Furthermore, these changes could recur a number of times. Moreover, the physical properties of this product were comparable to those of the product of polyethylene alone.

EXAMPLE 5

Five (5) parts by weight of the same catalyst master batch containing dibutyltin dilaurate as used in Example 4 was blended with 100 parts by weight of a silane-crosslinkable polyethylene (trademark: Moldex S183N, Sumitomo Bakelite Co., Ltd.) followed by addition of 3 parts by weight of a microencapsulated thermochromic material (trademark: Chromicolor Green S-35, Matsui Shikiso Chemical Co., Ltd.; a green acid-responsive chromogenic substance, a phenolic acidic substance and an alcoholic solvent as microencapsulated in thermosetting resin). The mixture was blended in a tumbler for 15 minutes and processed in the same manner as Example 1 to provide about 105 parts by weight of a color patterning composition as crosslinked pellets measuring 1 mm in diameter. This color patterning composition had a degree of crosslinking equal to 75 weight %. While this composition was green at room temperature (25° C.), it became colorless when warmed to 35° C.

Then, 10 parts by weight of the above color patterning composition was added to a composition comprising 100 parts by weight of polyethylene resin (trademark: Sumikathene F210-6, Sumitomo Chemical Co., Ltd.), 2 parts by weight of a microencapsulated thermochromic material (trademark: Chromicolor Yellow S-15, Matsui Shikiso Chemical Co., Ltd.; a yellow acid-responsive chromogenic substance, a phenolic acidic substance and an alcoholic solvent as microencapsulated in thermosetting resin) and 1 part by weight of magnesium stearate and the mixture was blended in a tumbler for 15 minutes. Using a sheet molding machine, the above blend was molded into a sheet measuring 200 $\mu$m in thickness. This sheet presented a scales-like green-on-yellow pattern when the atmospheric temperature was 10° C. but when the atmospheric temperature rose to 25° C., the yellow background became colorless to leave only the green scales prominent. When the temperature rose further to 35° C., this pattern also disappeared so that the whole sheet became colorless. These changes could recur a number of times. Moreover, the physical properties of the product were comparable to those of the reference product made of polyethylene alone.

COMPARATIVE EXAMPLE 1

Using the same materials as used in Example 1 except that a non-crosslinkable polypropylene resin having a high melt viscosity (trademark: Mitsubishi Polypro BR300, Mitsubishi Chemical Industries Ltd.; melt index 0.03) was used in lieu of the silane-crosslinkable polypropylene used in Example 1, tumbler blending was performed for 15 minutes and using an extrusion machine (bore diameter 40mm, L/D32), the blend was melt-extruded at 210° C. to provide pellets measuring 2 mm in diameter. However, the microcapsules containing the thermochromic material had been destroyed in the extrusion process, with a substantial loss of thermochromic function. Using this color patterning composition, a bath pail was molded in the same manner as in Example 1. However, this pail showed no change in the pattern color according to changes in temperature.

COMPARATIVE EXAMPLE 2

To 100 parts by weight of polysulfone resin (trademark: Udel PO-1700, Union Carbide) was added 0.1 part by weight of 1,3,3-trimethylspiro[indoline-2,3'-(3H)naphtho(2,1-b)(1,4)-oxazine] as a photochromic substance, and the mixture was blended in a tumbler for 15 minutes. Using an extruder (bore diameter 40 mm, L/D32), the blend was melt-extruded at 350° C. to provide pellets measuring 2 mm in diameter.

Then, 8 parts by weight of the above pelletized material was added to 100 parts by weight of polyethylene resin (trademark: Sumikathene F101-3, Sumitomo Chemical Co., Ltd.) supplemented with 0.4 part by weight of dry color (trademark: Yellow PP-020, Dainichi Seika Color & Chemicals Mfg. Co., Ltd.) and the mixture was blended in a tumbler for 15 minutes. Using a blow molding machine, the above blend was molded into a water bottle. This water bottle presented a light blue-on-yellow pattern but the pattern showed no change in color according to the available level of sunlight. Moreover, the physical properties of this product were inferior to those of the product made of polyethylene alone.

What is claimed is:

1. A reversibly variable color patterning composition for synthetic resin articles which comprises a granulated material containing (i) an olefin polymer and (ii) at least one reversibly variable color material selected from the group consisting of thermochromic materials and photochromic materials, said granulated material having been subjected to crosslinking reaction following granulation resulting in a crosslinked olefin polymer composition.

2. A color patterning composition as claimed in claim 1 wherein said olefin polymer is an olefin polymer having alkoxysilane groups.

3. A color patterning composition as claimed in claim 1 wherein said reversibly variable color material is a thermochromic material containing an acid-responsive chromogenic substance and an acidic substance.

4. A color patterning composition as claimed in claim 1 wherein said reversibly variable color material is a photochromic material containing an organic photochromic substance.

5. A color patterning composition as claimed in claim 1 wherein said reversibly variable color material is a microencapsulated material.

6. A method of producing a reversibly variable color patterning composition for synthetic resin articles, characterized by blending at least one reversibly variable color material selected from the group consisting of thermochromic materials and photochromic materials with an olefin polymer, granulating the resultant blend and subjecting the granulated material to crosslinking reaction.

7. A shaped article having a reversibly variable color pattern as molded from a molding composition comprising a second synthetic resin and the reversibly variable color patterning composition according to claim 1.

8. A shaped article as claimed in claim 7 as manufactured using 0.1 to 50 parts by weight of said color patterning composition per 100 parts by weight of said synthetic resin.

* * * * *